United States Patent [19]
Stephenson, III et al.

[11] Patent Number: 5,717,968
[45] Date of Patent: Feb. 10, 1998

[54] FORMAT INDICATING DAYLIGHT CAMERA, OPTICAL WRITING SYSTEM, AND METHOD FOR RECYCLING SINGLE USE CAMERAS

[75] Inventors: Stanley W. Stephenson, III, Spencerport; Harold J. Barrett, Brockport, both of N.Y.

[73] Assignee: Eastman Kodak Company, Rochester, N.Y.

[21] Appl. No.: 771,750

[22] Filed: Dec. 20, 1996

[51] Int. Cl.⁶ .............. G03B 17/24; G03B 7/00
[52] U.S. Cl. .............................. 396/315; 396/301
[58] Field of Search ....................... 396/315, 316, 396/317, 318, 311, 310, 301, 303

[56] References Cited

U.S. PATENT DOCUMENTS

| | | | |
|---|---|---|---|
| 3,961,850 | 6/1976 | Millett | 396/315 |
| 4,183,646 | 1/1980 | Tsunefuji | 396/311 |
| 4,235,544 | 11/1980 | Yamada et al. | 396/311 |
| 4,361,388 | 11/1982 | Micak et al. | 396/315 |
| 4,493,547 | 1/1985 | Bridges | 396/315 |
| 4,583,831 | 4/1986 | Harvey | 396/315 |
| 4,896,178 | 1/1990 | Ohmura et al. | 396/315 |
| 4,928,124 | 5/1990 | Taniguchi et al. | 396/315 |
| 4,973,997 | 11/1990 | Harvey | 396/315 |
| 4,994,830 | 2/1991 | Harvey | 396/315 |
| 5,095,324 | 3/1992 | Alyfuku et al. | 396/315 |
| 5,349,402 | 9/1994 | Soshi et al. | 396/311 |
| 5,471,266 | 11/1995 | Satou | 396/315 |
| 5,486,885 | 1/1996 | Matsumoto | 396/315 |
| 5,619,737 | 4/1997 | Horning et al. | 396/315 |

FOREIGN PATENT DOCUMENTS

| | | |
|---|---|---|
| 54-026721 | 2/1979 | Japan. |
| 63-199239 | 12/1988 | Japan. |

*Primary Examiner*—Safet Metjahic
*Assistant Examiner*—Nicholas J. Tuccillo
*Attorney, Agent, or Firm*—Robert Luke Walker

[57] ABSTRACT

A camera for use with photographic film. The camera has a body and an exposure system disposed in the body for exposing the film on a frame-by-frame basis. The exposure system includes an exposure opening and a shutter mechanism. The shutter mechanism is momentarily displaceable from a closed state to an open state. A light emitting diode 14 is disposed in the body for directly illuminating one or more positions on the film. Momentarily closeable, normally open contacts 16 are mounted in the body. The contacts 16 are closed for a time period of from about 0.05 milliseconds to about 10 milliseconds, or preferably from about 0.05 milliseconds to about 2 milliseconds, when the shutter mechanism is in the open state. A circuit directly connects the battery unit 18 to the light emitting diode 14 when the contacts 16 are closed. During contact closure, a battery unit 18 powers the light emitting diode 14 at a current level beyond continuous use operating limits of the light emitting diode 14.

19 Claims, 3 Drawing Sheets

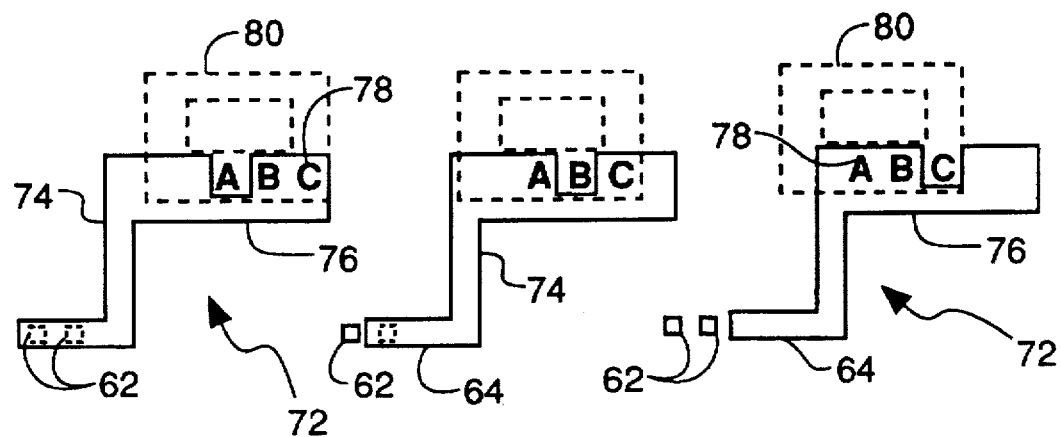
FIG. 3a  FIG. 3b  FIG. 3c
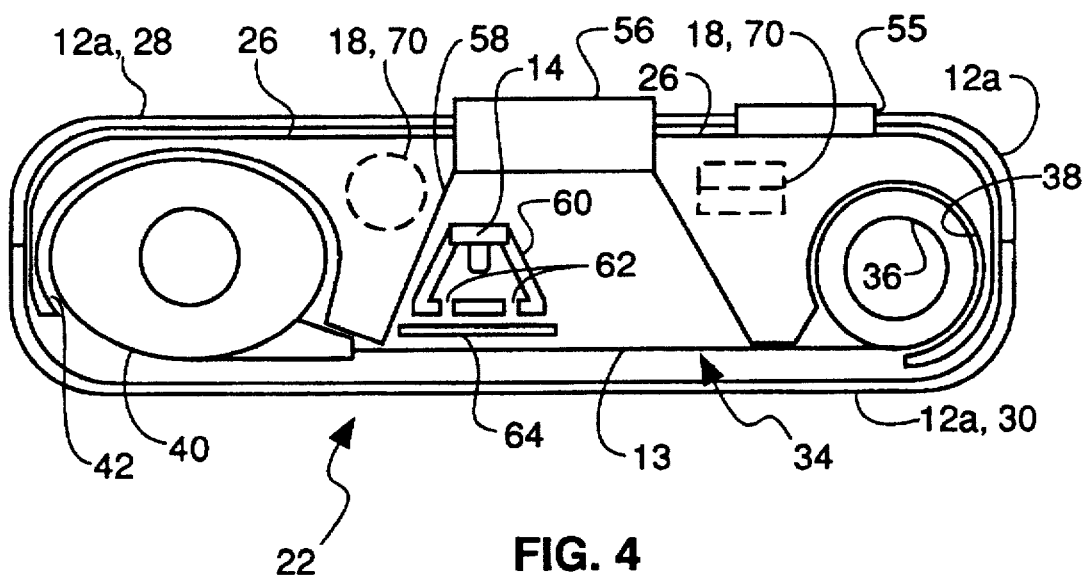
FIG. 4

FORMAT INDICATING DAYLIGHT CAMERA, OPTICAL WRITING SYSTEM, AND METHOD FOR RECYCLING SINGLE USE CAMERAS

CROSS-REFERENCE TO RELATED APPLICATION

This application is related to U.S. Ser. No. 08/388,783, entitled "CAMERA WITH MULTI-FORMAT SELECTION", filed Feb. 15, 1995 by Stanley W. Stephenson, Dennis R. Zander, and Harold J. Barrett

FIELD OF THE INVENTION

The invention relates to photography and more particularly relates to cameras intended for daylight or bright illumination which are capable of indicating the format of photographs in one or more formats (pseudo photography formats).

BACKGROUND OF THE INVENTION

Pseudo photography involves masking the viewfinder of a camera so that the user of the camera sees the particular picture which he wants printed, whether it be full frame (normal), telephoto or panoramic in nature, the latter being of course a type of pseudo wide angle photography. By suitably identifying on the film with respect to each exposure frame the particular viewfinder mask used in the exposure (encoding), the printer can determine how to mask the print or how to mask the negative when printing from the negative.

U.S. Pat. No. 4,973,997 discloses a camera that makes use of ambient light directed through light pipes to expose spots on the film to indicate normal, telephoto or panoramic print formats. Such use of ambient light can result in unreliability or underexposure under certain conditions.

It would thus be desirable to provide a camera that can expose one or more spots for indicating film format which does not use ambient light and does not use a complex circuit.

SUMMARY OF THE INVENTION

The invention is defined by the claims. The invention, in its broader aspects, provides a camera for use with photographic film. The camera has a body and an exposure system disposed in the body for exposing the film on a frame-by-frame basis. The exposure system includes an exposure opening and a shutter mechanism. The shutter mechanism is momentarily displaceable from a closed state to an open state. A light emitting diode is disposed in the body for directly illuminating one or more positions on the film. Momentarily closeable, normally open contacts are mounted in the body. The contacts are closed for a time period of from about 0.05 milliseconds to about 10 milliseconds, or preferably from about 0.05 milliseconds to about 2 milliseconds, when the shutter mechanism is in the open state. A circuit directly connects the battery unit to the light emitting diode when the contacts are closed. During contact closure, a battery unit powers the light emitting diode at a current level beyond continuous use operating limits of the light emitting diode.

It is an advantageous effect of at least some of the embodiments of the invention that a camera is provided that can expose one or more spots for indicating film format which does not use ambient light and does not use a complex circuit.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein:

FIGS. 3a, 3b, and 3c are diagrammatical views of the format selector of the camera of FIG. 1, shown in positions for encoding optical data indicating three formats. The position of the viewfinder is indicated by dashed lines. Indicia corresponding to the three formats are symbolized by the letters: "A", "B", "C".

FIG. 4 is a semi-diagrammatical top view of the interior of the camera of FIG. 1. Additional alternative positions for the batteries are indicated by dashed lines. For clarity, various components are not shown and some dimensions are exaggerated.

DESCRIPTION OF PARTICULAR EMBODIMENTS

Figure 1:
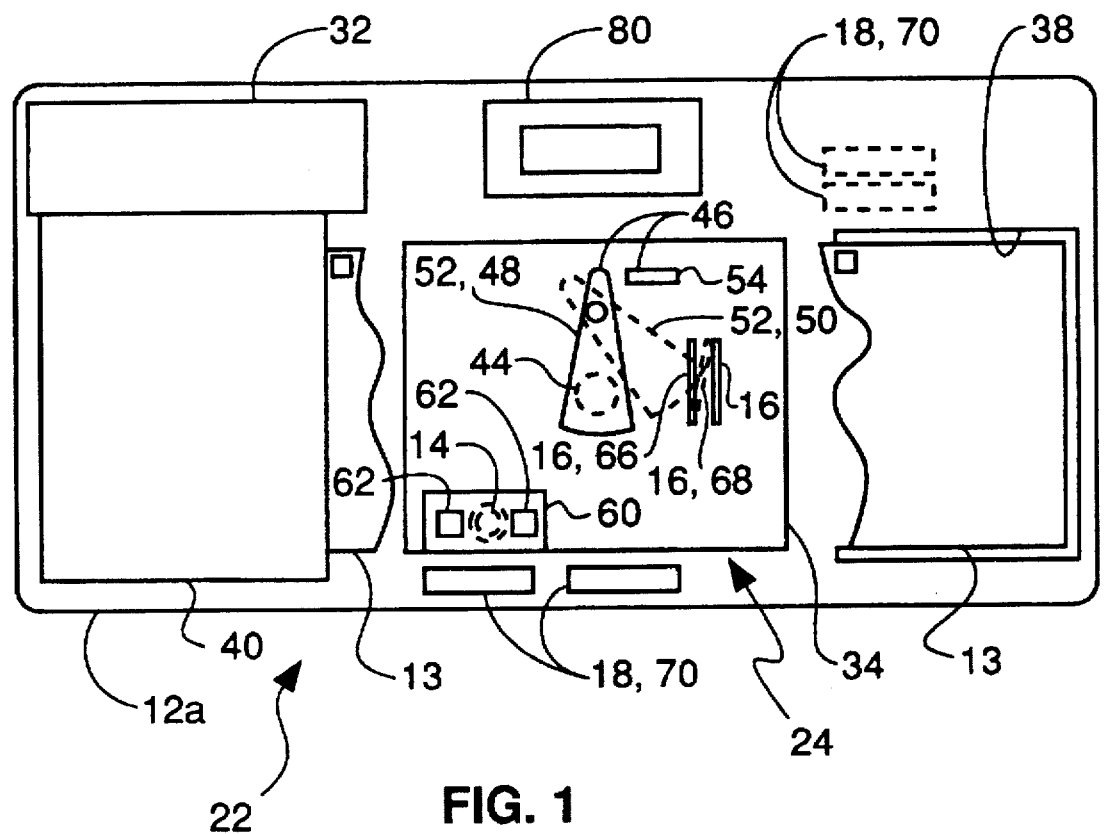
FIG. 1 is a semi-diagrammatical rear view of the interior of the camera of the invention. For clarity, part of the film is cut-away and the format selector and conductors of the electrical circuit are not shown. The shutter is illustrated in an open state by dashed lines and in a closed state by solid lines. The exposure opening is indicated by a dashed line. The batteries are shown in one alternative location by solid lines and in another alternative location by dashed lines. Some dimensions are exaggerated for clarity.
Figure 2:
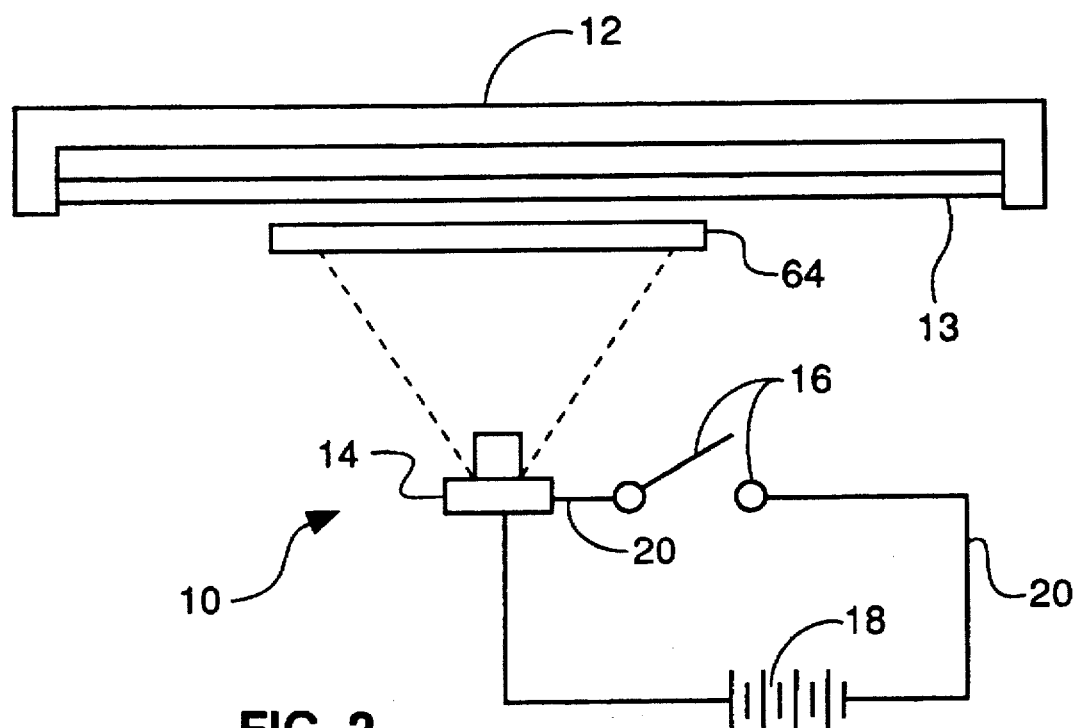
FIG. 2 is a diagrammatical view of the optical writing system of the invention as incorporated in the camera of FIG. 1. The area of illumination of the light emitting diode is indicated by dashed lines.
Figure 5:
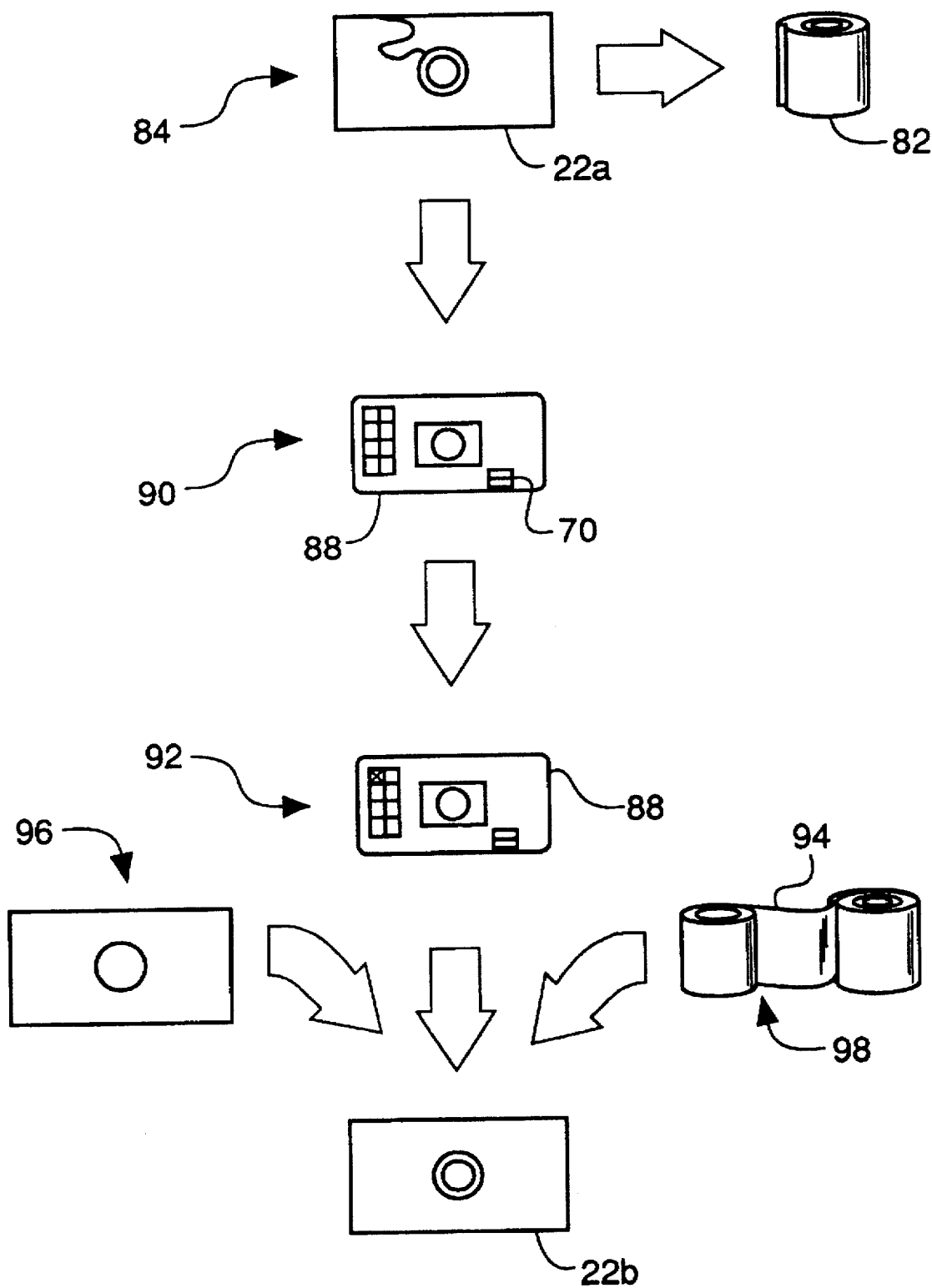
FIG. 5 is a diagrammatical view of the method of the invention.

Referring now to FIGS. 1 and 2, the optical writing system 10 of the invention includes a photographic film holder 12 for holding photographic film 13; a light emitting diode 14; electrical contacts 16; a battery unit 18; and conductors 20 to complete the circuit between the light emitting diode 14, contacts 16, and battery unit 18. In a preferred embodiment of the invention, the optical writing system 10 is incorporated as part of the reusable or single use camera 22 of the invention; however, the optical writing system 10 can be utilized as an independent article, for example, to optically mark the film leader of a roll of film; or can be utilized as a component of other articles that utilize photographic film, such as, photographic film-type radiation monitor badges. The following discussion is primarily directed to cameras of the invention, but it will be understood that similar characteristics could be provided in a non-camera optical writing system of the invention.

Referring now to FIGS. 1–4, in the camera 22 of the invention the film holder of the optical writing system is a camera body 12a. Mounted in the body 12a is an exposure system 24 that receives light from an object to be photographed and directs that light to the film 13.

The camera of the invention is not limited as to use of any particular type of camera body; however, the invention is particularly advantageous for small cameras; since, apart from the film holder, all the components of the optical writing system of the invention are very small. Thus a desirable body for a camera of the invention minimizes dead space, that is, minimizes unused empty spaces within the assembled camera. Since the non-film holding components of the optical writing system are so small; a suitable body can be designed by first accomodating larger components, then making modifications for improved aesthetics and reduced manufacturing costs, then attempting to fit the optical writing system within any dead spaces provided as artifacts of the earlier steps of the design process and finally considering modifying the design to accomodate the optical writing system only if existing dead spaces are inadequate.

Within these desired limitations, the body 12a of the camera 22 can take a wide variety of forms. For example, the figures are generally directed to cameras 22 having clamshell bodies, having all or most components attached to an internal frame member or carcass 26, which is covered by clamshell shaped front and rear covers 28,30. This type of camera body is commonly used in single use cameras. Another body type commonly used in small cameras has a major front portion with or without an inserted carcass bearing the operative components and a flat or L-shaped back panel.

The exposure system 24 is mounted in the body 12a and directs light from the object to be photographed to a frame of the film 13. The exposure system 24 can be limited to use with a single frame of film, but preferably includes a film transport 32 to move the film on a frame-by-frame basis, i.e., one frame at a time, through an exposure chamber 34. A very wide variety of film transports are well known to those of skill in the art. The film transport 32 can be manual or motor driven and can include any of a variety of known components such as advance levers, thumbwheels, rewinds, sprockets, gear trains, sliding pawls, clutches, and motors in any of a variety of combinations. FIGS. 1 and 4 diagrammatically illustrate a type of film transport commonly found in single use cameras. Unexposed film in the form of a scroll around a spool or a spool-less roll 36 is advanced from an unexposed film chamber 38 back into a film canister or patrone 40 resting in a second chamber 42. This film transport 32 lacks any components to rewind the film after exposure, since rewinding is unnecessary. The film transport 32 can include a number of other features useful in both moving the film and positioning the film relative to the exposure chamber 34. For example, the film transport can include a member that interacts with the active light lock of an Advanced photo System[198] (APS™) cartridge. The body 12a can include features interactive with the film transport 32 to help maintain the configuration of the film 13 relative to the film exposure chamber 34, such as a shaped back member or resilient film support (not shown).

The invention is not limited to use of any particular type of film or film magazine or cartridge. For example, the figures illustrate sprocketed film and an elliptical film cartridge; but the invention can also utilize non-sprocketed film and film in other types of cartridge, such as 135 or 110 type cartridges.

The exposure system 24 includes an exposure opening 44 and a shutter mechanism 46, which is momentarily displaceable from a closed state 48, in which the exposure opening is blocked, and an open state 50 in which light from an object to be photographed propagates through the exposure opening 44. The shutter mechanism 46 includes one or more shutter elements 52 and a shutter actuator 54. The contacts 16 are positioned such that the movement of the shutter mechanism 46 causes the contacts 16 to close. The shutter mechanism 46 provides for relatively rapid shutter movement such that the contacts 16 are closed for a time period of from about 0.05 milliseconds to about 10 milliseconds, or preferably from about 0.05 milliseconds to about 2 milliseconds. Suitable shutter mechanism for this purpose are well known to those of skill in the art. For example, most conventional single use camera mechanisms provide both shutters of suitable speed and appropriately positioned contacts which could also be used in camera 22. (The contacts on those cameras are used as momentarily closing, normally open flash synchronization contacts.) On some cameras, such as the Kodak pocket Funsaver™, marketed by Eastman Kodak Company, Rochester, N.Y.; one of the flash synchronization contacts and a shutter blade are parts of a unitary metal leaf. Such shutter mechanisms and contacts are also useful for camera 22.

A currently preferred shutter mechanism 46 is disclosed in U.S. Pat. No. 4,896,178, which is hereby incorporated herein by reference. In this mechanism, as shown semi-diagrammatically in FIGS. 1 and 4, the shutter mechanism 46 has a shutter element 52 that is actuated by a shutter actuator or high energy lever 54 driven by a spring (not shown) and is connected to a shutter release 55.

The shutter mechanisms above-discussed utilize a single leaf type shutter. With this type of shutter mechanism, there is a single closed position and the open state represents a continuum of shutter positions from open to closed. The invention is not limited to single leaf shutter mechanisms. The shutter mechanism can have a multiple element shutter, in which case, the closed state can represent multiple closed positions of the various elements.

In addition to the exposure opening 44 and shutter mechanism 46, the exposure system 24 can also include any of a wide variety of features known to those of skill in the art for these purposes. The exposure system 24 can include any of a wide variety of lens systems 56. The exposure opening 44 can be provided as a part of a number of different components, such as a lens support (not shown) or baffle 58. Similarly the shutter mechanism 46 can also include additional features. For example, the shutter mechanism 46 can be integrated with the film transport 32 so that a single winding mechanism (not separately illustrated) can advance and meter the film and cock the shutter mechanism.

The light emitting diode 14 is disposed in the body 12a so as to directly illuminate one or more positions on the frame of film 13 in the exposure chamber 34. The illumination of the film by the light emitting diode 14 results in a latent image segment disposed in a known, predetermined location on the film relative to a respective film frame (and the latent image of the subject matter imaged by that film frame). The image segment provided in a currently preferred embodiment of the camera of the invention is an encoded format designation in the form of one dot, two dots, or no dots. In this embodiment, the image segment is offset on the film from the fill frame.

The color of the light emitting diode 14 is not critical, however, in practical application, red light emitting diodes are lowest cost for visible light sensitive films. Red light emitting diodes are also convenient for use with APS film, since APS fill processing equipment looks for red densities (approximately 650 nm).

The figures illustrate a light emitting diode 14 that is attached to an LED holder 60. The LED holder 60 can be mounted to or formed as an integral part of the camera carcass 26. It is desirable that the LED holder 60 be small so that the light emitting diode 14 is close to the film 13. A suitable separation of film and light emitting diode is about 0.25 inches. The LED holder 60 includes holes 62 that define the shapes of the dots imaged on the fill. A blocking member 64, discussed more fully below, is mounted so as to be movable between the light emitting diode 60 or LED holder 62 and the film 13.

The invention is not limited to the formation of dot patterns or the like on the film. The holder can define indicia or a small visual image. For example, in a non-camera optical writing system of the invention, the holder could define identification information to be written to a filmchip. Similarly, the holder can be dispensed with and be replaced by a blocking member that blocks or defines one or more images depending upon its position.

The contacts 16 are mounted in the body 12a and are positioned so as to be operated by the shutter mechanism 46 and momentarily move from an open condition 66 to a closed condition 68. In the embodiment shown in the figures, the contacts 16 are struck by the shutter element 52 when the shutter element 52 moves from the closed state 48 to the open state 50 and then back to the closed state 48. The contacts 16 are momentarily closeable, normally open. Suitable contacts 16 are made the same as flash synchronization contacts commonly used in single use cameras. Such contacts are generally operated directly by movement of a leaf shutter and commonly consist of a resilient conductor that is pushed by the shutter against a second conductor. An example of such contacts are two copper leaves having a thickness of from about 0.002 inches to about 0.005 inches. The resilient conductor or conductors also acts as a spring for the shutter to help the shutter more quickly reverse direction.

As noted above, the displacement of the shutter mechanism 46 to the open state 50 causes the contacts 16 to be closed for a time period of from about 0.05 milliseconds to about 10 milliseconds, preferably the contacts 16 close for from about 0.05 milliseconds to about 2 milliseconds. In a more preferred embodiment of the invention, the contacts 16 close for about 1 millisecond.

The battery unit 18 is selected to power the light emitting diode 14 at a current level beyond continuous use operating limits of the light emitting diode 14. A suitable light emitting diode is rated for continuous use at 20 milliamps at 1.5 volts. It is desirable to use a battery unit 18 and contact closing time that result in a current level of less than about 50 times the rated continuous use operating amperage limit of the light emitting diode 14. It is even more desirable that the battery unit 18 and contact time result in an overamperage of no more than about 10 times the rated capacity. The overamperage must, however, be sufficient to cause the light emitting diode 14 to operate at the voltage supplied by the battery unit 18 and provide sufficient light to expose the film. A suitable exposure, for example, provides a density at a monitored wavelength that is at least 0.5 times greater than the base density (D-rain) of the film as measured by a Kodak Model 2 Densitometer, marketed by Eastman Kodak Company, Rochester, N.Y. The battery unit 18 has one or more batteries 70 and can include a resistor in series with a battery if necessary. Small batteries are desirable for the battery unit 18, such as a pair of nominal 1.5 volt button cells in series. The button cells are very small and can be placed together electrode-to-electrode or can be arranged in some other manner and be electrically connected together by a conductor. The size of the button cells is such that when the cells are placed end to end, the maximum dimension of the battery unit 18 is equal to or less than the diameter of the film scroll 36 of unexposed film or, in a single use camera, less than the diameter of a substantially cylindrical film scroll space 38 for storage of unexposed photographic film defined in the body 12a.

A particularly suitable button cell for this purpose is a type 389 A cell, which is 0.45 inches in diameter and 0.112 inches thick. Two of these cells in series provide a battery unit 18 that requires no additional resistor. A battery unit having two type 389 A cells in series when used with a light emitting diode rated for continuous use at 20 milliamps and contacts 16 that closed for about 1 millisecond was tested and successfully provided spots at about 0.8 density above base density of the film, measured as above indicated. The light emitting diode used required greater than 1.5 volts of bias potential to emit light. Two 389 A cells were used to raise the bias voltage above 1.5 volts to about 3.0 volts. The light emitting diode was subjected to 300 activations and continued to glow at about the same intensity.

The electrical circuit of the optical writing system is completed by conductors 20 connecting the light emitting diode 14, contacts 16, and battery unit 18. The circuit can include other electrical components, that do not significantly modify the operation of the circuit, however, this is generally not desirable for reasons of both space and expense. The camera of the invention could include separate flash circuitry, however, this would greatly detract from size and low cost advantages otherwise available.

The camera of the invention can be configured such that the light emitting diode 14 marks each frame with the same dot pattern. With APS film or the like, photofinishing equipment would read the dot pattern and process each frame with the same picture format, for example, panoramic format. The camera of the invention can also be provided with means for selectively varying the illumination of the film by the light emitting diode 14. For example, APS film can be selectively encoded with dot patterns corresponding to two or more formats. In these embodiments of the invention, a blocking member 64 is selectively interposable between the film and the light emitting diode 14. FIGS. 3a–3c illustrate an embodiment of the invention in which a film format selector 72 shaped like a backwards letter "Z" has an arm 74 connecting a blocking member 64 to a visible format indicator 76. The selector 72 has a handle (not shown) that can be moved back and forth by a user to slide the selector 72 relative to holes 62 in the LED holder 60 and indicia 78 visible through a viewfinder 80. The number of holes 62 covered, and spots produced on the film corresponds to a different film format, as indicated by respective indicia 78 in the viewfinder 80, symbolized: "A", "B", "C". The visible format indicator 76 could also another type of viewfinder mask in which areas of the viewfinder inappropriate to a particular format are at least partially obscured when the mask is moved into that position. A suitable viewfinder mask of this type is disclosed in U.S. Pat. No. 4,583,831, which is incorporated herein by reference. The visible format indicator could also be as simple as a pointer located so as to point toward appropriate indicia on the camera body.

As previously indicated, the camera of the invention is particularly suitable as a single use camera lacking a rewind mechanism. In a currently preferred such camera, the body 12a includes front and rear covers 28,30 and a recyclable frame member or carcass 26 and the exposure system 24, light emitting diode 14, contacts 16, battery unit 18, and conductors 20 of the circuit are mounted to the frame member 26. This is a practical approach for recycling of single use camera, since front and rear covers are commonly damaged and are more suitable for use as feedstocks than for direct recycling. Unlike previous single use cameras, in which batteries are replaced prior to recycling, in the camera of the invention, the battery 70 can be recycled without replacement, without significant risk of insufficient battery power during the lifetime of the recycled camera. To prevent inadvertent removal of the battery unit 18, it is desirable that the battery or batteries 70 be permanently mounted in the frame member 26. It is desirable that the frame member 26 be marked to limit use to a predetermined number of recycling cycles. Such marking of recycled cameras is known and is not difficult.

In the recycling method of the invention, exposed film 82 is first removed (84) from the used camera 22a (illustrated as being damaged). Components having operational parameters below nominal values are then discarded (86). A frame assembly 88 including the carcass, light emitting diode, and at least one original battery 70, or preferably, a pair of permanently mounted button cell batteries, is retained (90). The frame assembly 88 is preferably marked (92) to indicate another reuse cycle. Replacement parts are provided (96). Fresh film 94 is inserted (98) and the recycled camera 22b is ready for reuse.

While specific embodiments of the invention have been shown and described herein for purposes of illustration, the protection afforded by any patent which may issue upon this application is not strictly limited to a disclosed embodiment; but rather extends to all modifications and arrangements which fallfairly within the scope of the claims which are appended hereto:

parts list optical writing system 10
photographic film holder 12
camera body 12a
photographic film 13
light emitting diode 14
contacts 16
battery unit 18
conductors 20
camera 22
exposure system 24
frame member or carcass 26
front and rear covers 28,30
film transport 32
exposure chamber 34
roll 36
film chamber 38
canister 40
second film chamber 42
exposure opening 44
shutter mechanism 46
closed state 48
open state 50
shutter element 52
shutter actuator 54
shutter release 55
lens system 56
baffle 58
LED holder 60
holes 62
blocking member 64
open condition 66
closed condition 68
battery 70
selector 72
arm 74
indicator 76
indicia 78
viewfinder 80
exposed film 82
removal step (84)
discard step (86)
frame assembly 88 retaining step (90)
marking step (92)
fresh film 94
providing step (96)
inserting step (98)

What is claimed is:

1. A camera for use with photographic film, said camera comprising:

a body;

an exposure system disposed in said body for exposing said film on a frame-by-frame basis, said exposure system including an exposure opening and a shutter mechanism, said shutter mechanism being momentarily displaceable from a closed state to an open state;

a light emitting diode disposed in said body for directly illuminating one or more positions on said film;

momentarily closeable, normally open contacts mounted in said body, said contacts being closed for a time period of from about 0.05 milliseconds to about 10 milliseconds when said shutter mechanism is in said open state, a battery unit selected to power said light emitting diode at a current level beyond continuous use operating limits of said light emitting diode;

and a circuit electrically connecting said light emitting diode, said contacts and said battery unit said circuit directly connecting said battery unit to said light emitting diode when said contacts are closed.

2. The camera of claim 1 wherein said contacts are closed for a time period of from about 0.05 milliseconds to about 2milliseconds when said shutter mechanism in said open state.

3. The camera of claim 2 wherein said battery unit is selected to power said light emitting diode at a current level of less than about 50 times the rated continuous use operating amperage limit of said light emitting diode.

4. The camera of claim 2 wherein said battery unit is selected to power said light emitting diode at a current level of less than about 10 times the rated continuous use operating amperage limit of said light emitting diode.

5. The camera of claim 2 further comprising means for selectively varying the illumination of said film by said light emitting diode.

6. The camera of claim 2 wherein said body defines a substantially cylindrical film scroll space for storage of unexposed photographic film and said battery unit has a maximum dimension substantially equal to or less than the diameter of said film scroll space.

7. The camera of claim 2 wherein said battery unit further comprises a pair of button cells electrically connected in series.

8. The camera of claim 7 wherein said batteries are each rated for a nominal voltage of 3 volts.

9. The camera of claim 2 wherein said camera is a single use camera and lacks a film rewind mechanism.

10. The camera of claim 9 wherein said body includes a recyclable frame member and said exposure system, light emitting diode, contacts, battery unit, and circuit are mounted to said frame.

11. The camera of claim 9 wherein said body includes a recyclable frame and said battery unit includes at least one battery permanently mounted to said frame member.

12. The camera of claim 2 further comprising an aperture disposed in said body between said light emitting diode and said film for controlling illumination by said light emitting diode to provide a predetermined coded pattern of exposure on said one or more positions of said film.

13. The camera of claim 12 further comprising a blocking member positionable between said aperture and said film to cover or uncover said aperture to regulate film exposure by the light passing through said aperture.

14. The camera of claim 13 further comprising a visible format indicator movable with said blocking member.

15. The camera of claim 13 further comprising a viewfinder mounted to said body and a mask movable between a first position and at least two other positions, said mask in at least one of said positions at least partially obscuring a portion of said viewfinder, said mask being operatively connected to and movable with said blocking member.

16. The camera of claim 15 wherein said body defines a substantially cylindrical film scroll space for storage of unexposed photographic film and said battery unit has a maximum dimension substantially equal to or less than the diameter of said film scroll space.

17. An optical writing system for use with photographic film, said system comprising:

a film holder;

a light emitting diode disposed to illuminate one or more positions on said film;

contacts closable for a time period of from about 0.05 milliseconds to about 10 milliseconds, a battery unit selected to power said light emitting diode at a current level beyond continuous use operating limits of said light emitting diode;

and a circuit electrically connecting said light emitting diode, said contacts, and said battery unit, said circuit directly connecting said battery unit to said light emitting diode when said contacts are closed.

18. The system of claim 17 further comprising an aperture disposed in said body between said light emitting diode and said film for controlling illumination by said light emitting diode to provide a predetermined coded pattern of exposure on said one or more positions of said film.

19. The system of claim 18 further comprising a blocking member positionable between said aperture and said film to cover or uncover said aperture to regulate film exposure by the light passing through said aperture.

* * * * *